United States Patent
Bartsch

(10) Patent No.: US 6,195,995 B1
(45) Date of Patent: Mar. 6, 2001

(54) HYDRAULIC BRAKE SYSTEM WITH DEVICE FOR ACTIVE BRAKING

(75) Inventor: Thomas Bartsch, Niedernhausen (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/101,412

(22) PCT Filed: Jan. 17, 1997

(86) PCT No.: PCT/EP97/00190

§ 371 Date: Apr. 16, 1999

§ 102(e) Date: Apr. 16, 1999

(87) PCT Pub. No.: WO97/26168

PCT Pub. Date: Jul. 24, 1997

(30) Foreign Application Priority Data

Jan. 20, 1996 (DE) ............................................... 196 02 057

(51) Int. Cl.[7] ............................. B60T 13/122; F15B 7/04
(52) U.S. Cl. ................................ 60/564; 60/574; 303/10; 303/116.1; 303/113.2
(58) Field of Search ............................. 60/419, 479, 563, 60/564, 566, 574; 303/10, 113.2, 116.1, 115.4, 115.5

(56) References Cited

U.S. PATENT DOCUMENTS

| | | | |
|---|---|---|---|
| 2,974,493 | * 3/1961 | Hawley | 60/564 |
| 5,188,439 | * 2/1993 | Burgdorf et al. | 303/116.1 |
| 5,741,050 | * 4/1998 | Ganzel et al. | 303/115.4 |

FOREIGN PATENT DOCUMENTS

| | | |
|---|---|---|
| 2710067 | 9/1977 | (DE) . |
| 3444827 | 12/1986 | (DE) . |
| 3812830 | 7/1989 | (DE) . |
| 4017700 | 5/1991 | (DE) . |
| 4329139 | 7/1994 | (DE) . |
| 91/18776 | 12/1991 | (WO) . |

* cited by examiner

*Primary Examiner*—F. Daniel Lopez
(74) *Attorney, Agent, or Firm*—Rader, Fishman & Grauer PLLC

(57) ABSTRACT

Hydraulic Brake System with a Device for Active Braking In order to enable a hydraulic brake system which has a self-priming return pump (14) to quickly fill the wheel brakes (5) in an active braking operation, the present invention discloses the provision of a pressure-volume converter (20) on the pressure side of the return pump (14). The converter (20) causes a large pressure fluid volume to be conducted into the brake line (4) to the wheel brake (5) concerned at a small delivery volume of the return pump (14). This is possible because a return pump can generate high pressure and, thus, produce a sufficient amount of force to displace a stepped piston which can then displace a large quantity of pressure fluid. To permit the development of a sufficient back pressure on the pressure side of the return pump (14), a pilot pressure non-return valve (19) is arranged in the pressure line (18) which extends in parallel to the pressure-volume converter (20). Valve (19) permits the passage of the delivered pressure fluid volume to the brake line (4) only when a pilot pressure prevails.

5 Claims, 1 Drawing Sheet

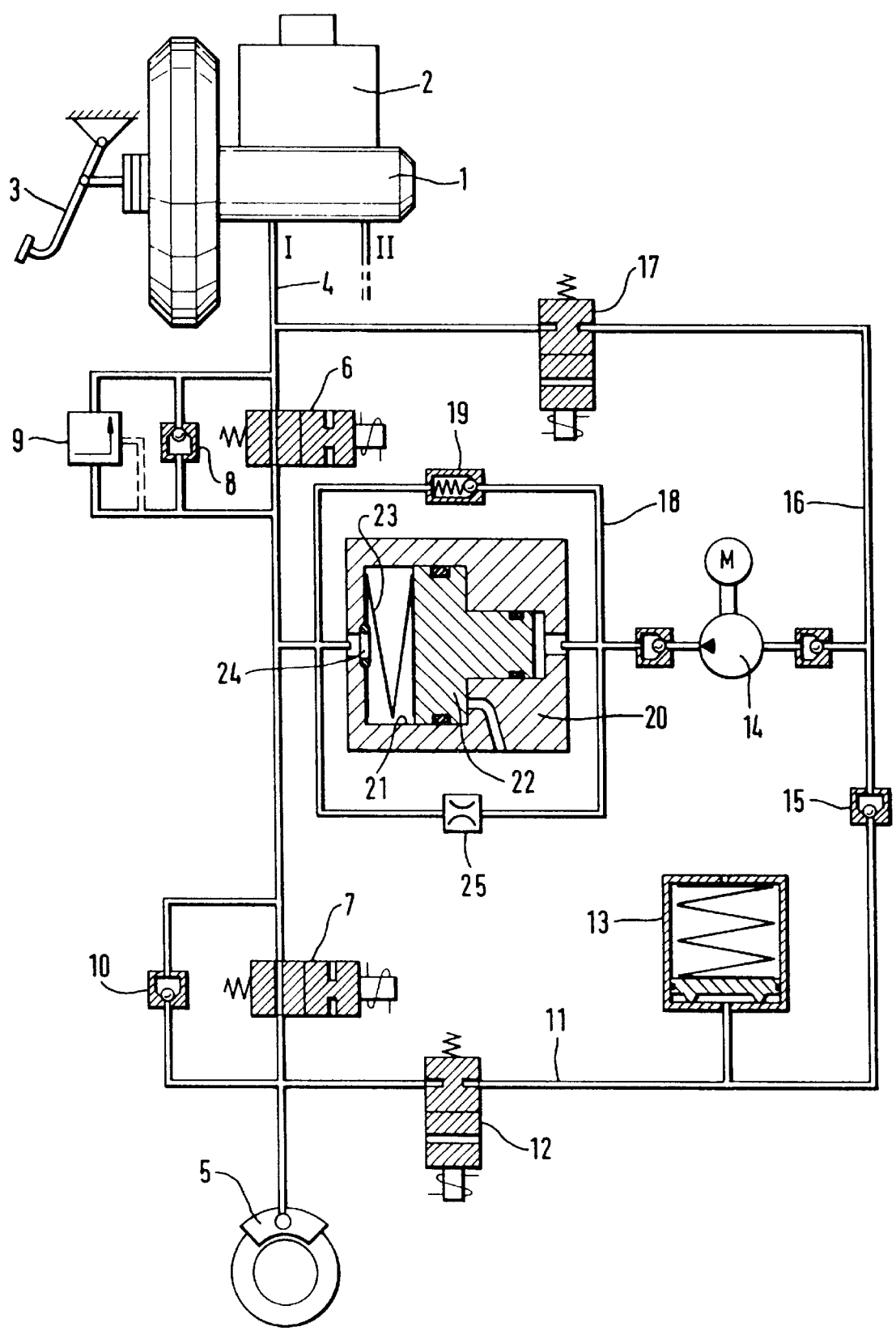

HYDRAULIC BRAKE SYSTEM WITH DEVICE FOR ACTIVE BRAKING

TECHNICAL FIELD

The present invention relates to a hydraulic brake system and more particularly relates to accumulators used in hydraulic brake systems.

BACKGROUND OF THE INVENTION

A brake system of this type is disclosed in WO 91/18776. The prior art brake system is appropriate for anti-lock control and traction slip control. Traction slip control operations, as a type of active braking, do not require the application of the brake pedal. Therefore, the wheel brakes of the driven wheels must be filled by a pump. The prior art system uses the return pump of the anti-lock control device for this purpose. In order that a return pump of the non self-priming type can also be used to this end, a pressure accumulator is provided in a suction line from the suction side of the pump to the master brake cylinder. The objective of the pressure accumulator is to furnish a pilot pressure to the suction side of the return pump during traction slip control operations. However, this arrangement is also appropriate to precharge a self-priming return pump. A switch valve is interposed between the pressure accumulator and the suction side of the return pump which will connect the pressure accumulator to the suction side of the return pump only when traction slip control shall be performed.

It is inconsequential to the present invention whether the return pump is of the self-priming type or requires precharging. The basic problem of using high-pressure pumps for brake systems is as follows. Before it is possible to achieve a braking effect on the wheel brakes, it is necessary to supply a defined volume into the brake line in order to overcome the clearance in the wheel brakes. Although return pumps are capable of developing high pressure, the volume of fluid delivered is so small that it takes a long time (at initial low pressures) to effect braking. To provide the fluid volumes necessary to overcome the clearance of wheel brake cylinders, a return pump (be it of the self-priming or the non self-priming type) is therefore only marginally adequate. This is because a large volume of fluid rather than high pressure is necessary to this end.

An object of the present invention is to equip a brake system of the above-mentioned type by simple means so that braking effects can quickly be achieved in active braking operations by use of the return pump.

The principle of the present invention is that the return pump acts upon a small effective surface of a stepped piston and, due to its high supply pressure, displaces the stepped piston, with the result that the large effective surface of the stepped piston displaces a pressure fluid volume greater than the one delivered by the return pump. Because overcoming the clearance of the wheel brakes does not necessitate high pressure, the large surface of the stepped piston may be rated considerably greater than the small surface. When a high pressure is required in the wheel brakes after this precharging action, the return pump can deliver fluid through the pressure line directly into the wheel brakes and generate a high pressure also with a low volume flow. However, in order that initially the stepped piston is displaced, a means is provided in the pressure line in parallel to this pressure-volume converter. This means initially accumulates the pump pressure.

A pilot pressure valve is suitable in this arrangement which has the advantage that it opens permanently at a constant pressure difference. Its opening pressure is rated so that the back pressure which develops is just sufficient to fill the wheel brake cylinders of the wheels subjected to active braking.

Spring bias of the stepped piston towards the pressure side of the pump causes an automatic charging of the volume accumulator when the return pump is deactivated.

In order that the fluid volume disposed between the pressure side of the pump and the stepped piston can be displaced when the volume accumulator is charged, it is advisable to provide a throttle device in parallel to the stepped piston. The enclosed fluid volume can be discharged through the throttle device towards the brake line.

A seat valve which closes the connection between the brake line and the stepped piston as soon as the stepped piston has overcome its stroke for filling the wheel brakes prevents a return movement of the stepped piston during active braking operations. Because the valve is so rated that it has an effective surface in the opening direction which is considerably smaller than the small stepped piston surface, the braking pressure which developed in the brake line due to the return pump is prevented from returning the stepped piston towards the return pump. Further, it is also prevented that the entire delivery volume of the return pump is discharged into the volume accumulator.

A particularly space-saving solution is achieved when the throttle (that is in parallel to the stepped piston) is positioned inside the stepped piston for relief of the pressure line between the return pump and the stepped piston. Besides, it is easier for a bore of this type to extend through a piston than through a valve block.

BRIEF DESCRIPTION OF THE DRAWING

The only FIGURE, FIG. 1, shows a symbolic view of a hydraulic brake system of the present invention.

DETAILED DESCRIPTION OF THE PREFERRED EMBODIMENT

A master cylinder 1 is connected to a supply reservoir 2 and operable by a brake pedal 3. A brake line 4 extends from the master cylinder 1 to a wheel brake 5. Another wheel brake (not shown) is also fed by the brake line 4. A second brake circuit II which is not shown may be designed identically as the brake circuit I.

A separating valve 6 is arranged in the brake line 4 which is an electromagnetically operated, normally open two-way/two-position directional control valve exactly as the inlet vale 7 that is inserted in closer proximity to the wheel brake 5. Connected in parallel to the separating valve 6 is a non-return valve 8 which permits pressure fluid flow from the master cylinder 1 to the wheel brake 5. A pressure-relief valve 9 opens in the opposite direction and reduces an excessively high pressure in the brake line 4 downstream of the separating valve 6 in an active braking operation, i.e., when the separating valve 6 is closed. An active braking operation refers to any type of braking intervention which may also be performed without application of the brake pedal 3.

Arranged in parallel to the inlet valve 7 is a non-return valve 10 which permits a quick pressure reduction from the wheel brake 5, even if the inlet valve 7 is still closed upon termination of braking. A return line 11 extends from the wheel brake 5 through an outlet valve 12 to a low-pressure accumulator 13 and further to the suction side of a self-priming return pump 14. Interposed into the return line 11 between the low-pressure accumulator 13 and the suction side of the return pump 14 is a non-return valve 15 which permits pressure fluid flow only to the suction side of the return pump 14. A suction line 16 branches from the brake line 4 between the master cylinder 1 and the separating valve 6 and also leads to the suction side of the return pump 14 by way of a change-over valve 17. Pump 14 is connected with its pressure side to the brake line 4 between the separating valve 6 and the inlet valve 7 by way of a pressure line 18 which includes a pilot pressure non-return valve 19. The pilot pressure non-return valve 19 is open only for a volume flow from the return pump 14 to the brake line 4. In parallel to the pressure line 18 is a pressure-volume converter 20. Converter 20 has a stepped piston 22 in a stepped bore 21. The small end surface of the stepped piston 22 is connected to the pressure side of the return pump 14. The large end surface of the stepped piston 22 points to the brake line 4. The large end surface of the stepped piston 22 is acted upon by a compression spring 23 towards the return pump 14. The step of the stepped piston 22 is connected to the atmosphere. At the outlet of the stepped bore 21 close to the brake line, there is a sealing seat 24 which has a diameter smaller than the small end surface of the stepped piston 22. Sealing seat 24 cooperates with the large end surface of the stepped piston 22 as a seat valve. Because the view is a merely schematic representation, the seat valve between the stepped bore 21 and the brake line 4 may also take a different shape. The only thing important is the opening cross-section which must be smaller than the small end surface of the stepped piston 22.

Further, a throttle 25 is provided in parallel to the pressure line 18 and the pressure-volume converter 20. Throttle 25 permits pressure fluid discharge from the pressure side of the return pump 14 to the brake line 4 when, upon standstill of the return pump 14, the compression spring 23 displaces the stepped piston 22 towards the return pump 14 and thus refills the volume accumulator opened by the action of the compression spring 23.

System Operation

All valves remain in their position shown in a pedal-actuated normal braking operation without critical slip values. Pressure increase in the wheel brake 5 and pressure reduction take place exclusively by way of the brake line 4.

When excessive brake slip values occur during pedal-actuated braking, an anti-lock control operation is required. The brake system operates according to the known return principle. Because braking pressure from the master cylinder 1 prevails already in the brake line 4, the supply pressure of the return pump 14 is not able to displace the stepped piston 22. The pressure in the brake line 4 has a considerably larger effective surface on the stepped piston 22 than the pressure side of the return pump 14.

In the case of an active braking operation, be it for traction slip control or any other controlling intervention such as yaw torque control, the brake pedal 3 is not applied. Thus, the master cylinder 1 is unpressurized as well as the brake line 4 up to the separating valve 6. Valve 6 is closed for an active braking operation. The return pump 14 starts to operate, and the normally closed change-over valve 17 is energized to open the suction line 16, with the result that the suction line 16 establishes a connection to the master cylinder 1 and, thus, to the supply reservoir 2. The return pump 14 aspirates pressure fluid and supplies it into the pressure line 18 and the pressure-volume converter 20. The pilot pressure non-return valve 19 initially causes development of pressure in the pressure line 18 and, accordingly, at the small end surface of the stepped piston 22 before the pressure fluid supplied can propagate towards the brake line 4. The pressure which develops on the pressure side of the return pump 14 causes displacement of the stepped piston 22 towards the brake line 4 at a small delivery volume already. However, because the brake line 4 faces the large end surface of the stepped piston 22, a considerably larger volume is displaced towards the brake line 4 than is required from the pressure side of the return pump 14 to displace the stepped piston 22. The pressure level built up in the brake line 4 is essentially lower than the one on the pressure side of the return pump 14. However, this is of hardly any significance because only a great volume, rather than a high pressure, is necessary to overcome the clearance of the wheel brake. Only after the stepped piston 22 has moved to bear against its sealing seat 24 is the return pump 14 in a position to develop high pressure which is capable of overcoming the pilot pressure non-return valve 19. The result of this provision is that the high pressure will then propagate into the brake line 4 downstream of the separating valve 6. An instantaneous braking effect is achieved as soon as the pressure in the brake line 4 reaches the wheel brake 5 because the wheel brake 5 has already been precharged. This pressure cannot cause return of the stepped piston 22 to the pressure side of the return pump because the sealing seat 24 has an essentially smaller diameter than the small-diameter piston portion. The pressure on the pressure side of the return pump 14 prevents return movement of the stepped piston 22. The pressure is controlled during an active braking operation by operation of the inlet valve 7 and the outlet valve 12 in a known fashion.

When an active braking operation is terminated, the separating valve 6 will open so that the braking pressure may be discharged by way of the brake line 4 and the master cylinder 1 into the supply reservoir 2. Pump 14 is switched off so that no further pressure fluid is delivered. The residual pressure which remains on the pressure side of the return pump decreases slowly by way of the throttle 25. This enables the compression spring 23 to displace the piston 22 again towards the return pump 14 up to its stop position shown. The volume accumulator which is opened due to the action of the compression spring 23 has thus been filled again and is ready for repeated active braking operations.

To provide a space-saving arrangement of the pressure-volume converter 20 and the parallel connected throttle 25, the throttle 25 (which is shown schematically in a position parallel to the stepped piston 22) may also extend through the stepped piston 22. In this case, throttle 25 interconnects the two end surfaces of the stepped piston, thus, the pressure side of the return pump 14 and the brake line 4. Throttle 25 may have a very narrow cross-section so that it will not impair the development of a back pressure on the pressure side of the return pump 14 during active braking operations. This is because the pressure fluid which must be displaced to reset the stepped piston 22 is comparatively small compared to the quantity of pressure fluid contained in the volume accumulator.

What is claimed is:

1. Hydraulic brake accumulator system, comprising:
   an body having side walls forming an axial bore,
   an axially displaceable stepped piston residing in said axial bore and having a small end surface that is connected to a pressure side of a return pump and a large end surface that is connected to a brake line,
   means for producing a pressure gradient between said pressure side of the return pump and the brake line wherein said producing means is positioned in a parallel extending pressure line, wherein a throttle is connected in parallel to the stepped piston and the pressure line.

2. Brake system as claimed in claim 1, wherein the producing means comprises a pilot pressure valve which closes the connection between the brake line and the pressure side of the return pump.

3. Brake system as claimed in claim 1, wherein the stepped piston is spring-loaded towards the pressure side of the return pump.

4. Brake system as claimed in claim 1, further including a seat valve which closes after a defined piston stroke of the stepped piston is overcome, the said valve interrupting the connection between the brake line and the large end surface of said piston and having an effective surface in the opening direction on the side of the brake line which is smaller than the small end surface of said piston.

5. Brake system as claimed in claim 1, wherein the throttle is provided within the stepped piston and interconnects the two end surfaces of the stepped piston.

* * * * *